US007778218B2

(12) United States Patent
Holma et al.

(10) Patent No.: US 7,778,218 B2
(45) Date of Patent: *Aug. 17, 2010

(54) POWER CONTROL OF NETWORK PART TRANSMITTER IN RADIO SYSTEM

(75) Inventors: Harri Holma, Irving, TX (US); Mika Raitola, Masala (FI)

(73) Assignee: Nokia Corporation, Espoo (FI)

( * ) Notice: Subject to any disclaimer, the term of this patent is extended or adjusted under 35 U.S.C. 154(b) by 274 days.

This patent is subject to a terminal disclaimer.

(21) Appl. No.: 11/955,100

(22) Filed: Dec. 12, 2007

(65) Prior Publication Data

US 2008/0090602 A1 Apr. 17, 2008

Related U.S. Application Data

(63) Continuation of application No. 10/012,048, filed on Dec. 11, 2001, now Pat. No. 7,333,450, and a continuation of application No. PCT/FI00/00509, filed on Jun. 7, 2000.

(30) Foreign Application Priority Data

Jun. 11, 1999 (FI) .................................. 991351

(51) Int. Cl.
*H04Q 7/00* (2006.01)
(52) U.S. Cl. ....................................... 370/328; 370/345
(58) Field of Classification Search ................. 370/328, 370/335, 336, 337, 338, 342, 345, 347; 455/69, 455/522

See application file for complete search history.

(56) References Cited

U.S. PATENT DOCUMENTS 6,147,981 A * 11/2000 Prescott ....................... 370/318

(Continued)

FOREIGN PATENT DOCUMENTS

WO WO-98/49796 A2 11/1998

(Continued)

OTHER PUBLICATIONS

Bhargava et al, "D2PAMN: Distributed Dynamic Power and Error Control Algorithm for Mobile Networks," IEEE Proceedings, Sixth International Symposium on Modeling, Analysis and Simulation of Computer and Telecommunication Systems, 1998, pp. 295-300.

(Continued)

*Primary Examiner*—Ricky Ngo
*Assistant Examiner*—Christine Ng
(74) *Attorney, Agent, or Firm*—Harrington & Smith

(57) ABSTRACT

An apparatus, method, and computer-readable medium in various embodiments includes a transmitter that establishes a radio connection that sends signals to a user equipment using a required transmission power; a receiver that receives a signal sent by the user equipment over the radio connection, the signal comprising at least one power control command determined by the user equipment; and a processor configured to specify the required transmission power in the transmitter using a delay requirement of a service to be transferred over the radio connection and the at least one power control command as a basis for making the power control decision, wherein at least one dedicated physical channel and at least a part of a shared physical channel that is time-divisionally shared are allocated to the user equipment on the radio connection, wherein the processor is further configured to carry out the power control of the time-divisionally shared physical channel on the basis of the power control decision of the dedicated physical channel.

17 Claims, 6 Drawing Sheets

U.S. PATENT DOCUMENTS

| | | | |
|---|---|---|---|
| 6,173,162 B1 * | 1/2001 | Dahlman et al. | 455/69 |
| 6,256,476 B1 * | 7/2001 | Beamish et al. | 340/7.36 |
| 6,643,275 B1 * | 11/2003 | Gustafsson et al. | 370/328 |
| 6,693,892 B1 * | 2/2004 | Rinne et al. | 370/348 |
| 6,788,685 B1 * | 9/2004 | Holtzman et al. | 370/391 |
| 7,333,450 B2 * | 2/2008 | Holma et al. | 370/328 |

FOREIGN PATENT DOCUMENTS

| | | |
|---|---|---|
| WO | WO-98/49797 A2 | 11/1998 |
| WO | 9858461 | 12/1998 |
| WO | 9907170 | 2/1999 |
| WO | 9953701 | 10/1999 |

OTHER PUBLICATIONS

Raitola et al., "Wideband CDMA Packet Data with Hybrid ARQ," IEEE Proceedings, Fifth International Symposium on Spread Spectrum Techniques and Applications, 1998, pp. 318-322.

Wong fet al., "Analysis of Wireless Multimedia DS/CDMA System with Hybird ARQ Diversity and Power Control," 48th IEEE Vehicular Technology Conference, vol. 3, 1998, pp. 2197-2201.

None, UTRA FDD, Physical Layer Procedures, 3GPP, TS 25,214, 31 pp. (Apr. 1999).

* cited by examiner

POWER CONTROL OF NETWORK PART TRANSMITTER IN RADIO SYSTEM

CROSS-REFERENCE TO RELATED APPLICATIONS

This application is a Continuation under 35 U.S.C. §120 of co-pending U.S. application Ser. No. 10/012,048, filed on Dec. 11, 2001. Application Ser. No. 10/012,048 is a Continuation under 35 U.S.C. §120 of International Application PCT/FI00/00509, filed on Jun. 7, 2000. International Application PCT/FI00/00509 claims priority to Finnish Application No. 991351, filed on Jun. 11, 1999. The entire contents of each of these applications are incorporated herein by reference.

BACKGROUND

This disclosure relates to a method for performing power control of a network part transmitter in a radio system and a network part in the radio system using the method.

Code Division Multiple Access (CDMA) radio systems employ two types of power control, uplink power control and downlink power control. The uplink power control solves what is known as the near-far effect, i.e. a situation in which the transmission of a user equipment located far from the base station fades under the transmission of a user equipment near the base station if no power control is used.

The present disclosure relates to downlink power control, where power control is needed to reduce multi-user interference, or to reduce interference caused to other cells, and to compensate the interference caused by other cells.

For example, IS-95 radio system uses slow power control. The system is mainly intended for speech transmission. The base station periodically reduces the power control employed. A user equipment measures a frame error ratio and when the frame error ratio exceeds a predetermined limit, for example one percent, the user equipment requests for more transmission power from the base station. The power control is carried out at approximately 15 to 20 millisecond intervals (the frequency being 50 to 67 Hz), and the dynamic power control range is plus/minus six decibels.

More recent CDMA systems, such as the cdma2000 system or the WCDMA system, also use fast power control, and the power control can be carried out individually for each slot of the frame, and the dynamic power control range is fairly large. The frequency of fast power control is, for example, 800 Hz or 1600 Hz.

In recent mobile systems data is transferred in addition to speech, but the power control is not optimized in any way according to the requirements the services to be transferred set for the power control.

SUMMARY

It is an object of the disclosure to provide a method and an apparatus implementing the method, in which the power control of a transmitter is optimally implemented regarding the different services to be transferred over a radio connection. This is achieved with the method described below. The method concerned refers to a method for performing power control of a network part transmitter in a radio system, comprising the steps of establishing a radio connection from the network part transmitter to a user equipment, sending a signal on the radio connection from the network part transmitter using the transmission power required, receiving the signal in the user equipment, measuring a quality value for the signal and determining a power control command based on the quality value, signaling the power control command from the user equipment to the transmitter. The method comprises the steps of specifying the power control required in the transmitter using a delay requirement of a service to be transferred over the radio connection and at least one received power control command as the basis for making a power control decision, continuing to perform the method from the second operation, i.e. sending a signal on the radio connection from the network part transmitter using the transmission power required.

The disclosure also relates to a network part of a radio system comprising a transmitter for establishing a radio connection to a user equipment, the radio connection being formed of signals, which are transmitted using the transmission power required, a receiver for receiving on a radio connection a signal sent by the user equipment, the signal comprising a power control command determined by the user equipment. The network part further comprises decision means for specifying the transmission power required in the transmitter using a delay requirement of a service to be transferred over the radio connection and at least one received power control command as the basis for making a power control decision.

One aspect of the disclosure is that, according to studies carried out by the Applicant, an optimal power control method exists for each service to be transferred. The services to be transferred are distinguished from one another on the basis of a delay requirement thereof. It is decided in accordance with the delay requirement how frequently power control is actually performed. The power control frequency does not therefore necessarily depend on the frequency of the power control commands to be received.

The method and the system of the disclosure provides at least such an advantage that the downlink capacity from the network part to the user equipment increases since the average signal-to-interference ratio thereof improves.

BRIEF DESCRIPTION OF THE DRAWINGS

In the following the disclosure will be described in greater detail by means of various embodiments with reference to accompanying drawings, in which.

DETAILED DESCRIPTION

The disclosure can be used in all radio systems in which downlink power control is required and in which different services are transferred over a radio connection. A transmission channel can be formed by means of a time division, frequency division or code division multiple access method, for example. The disclosure also covers systems utilizing combinations of different multiple access methods. The examples describe how the disclosure is used in a universal mobile telecommunication system employing a wideband code division multiple access method, however, without restricting the disclosure thereto.

The structure of a universal mobile telecommunications system is described below with reference to FIGS. 1A and 1B. FIG. 1B shows only the blocks that are essential for illustrating the disclosure, but it is obvious to those skilled in the art that a conventional mobile system also includes other functions and structures which do not have to be described in greater detail herein. The main components of a mobile system are a core network CN, a UMTS terrestrial radio access network UTRAN and a user equipment UE. The interface between the CN and the UTRAN is referred to as Iu, and the air interface between the UTRAN and the UE is referred to as Uu.

The UTRAN consists of radio network subsystems RNS. The interface between RNSs is referred to as Iur. An RNS comprises a radio network controller RNC and one or more nodes B. The interface between an RNC and node B is referred to as Iub. The coverage area of node B, i.e. a cell, is denoted in FIG. 1B by C.

Figure 1A:
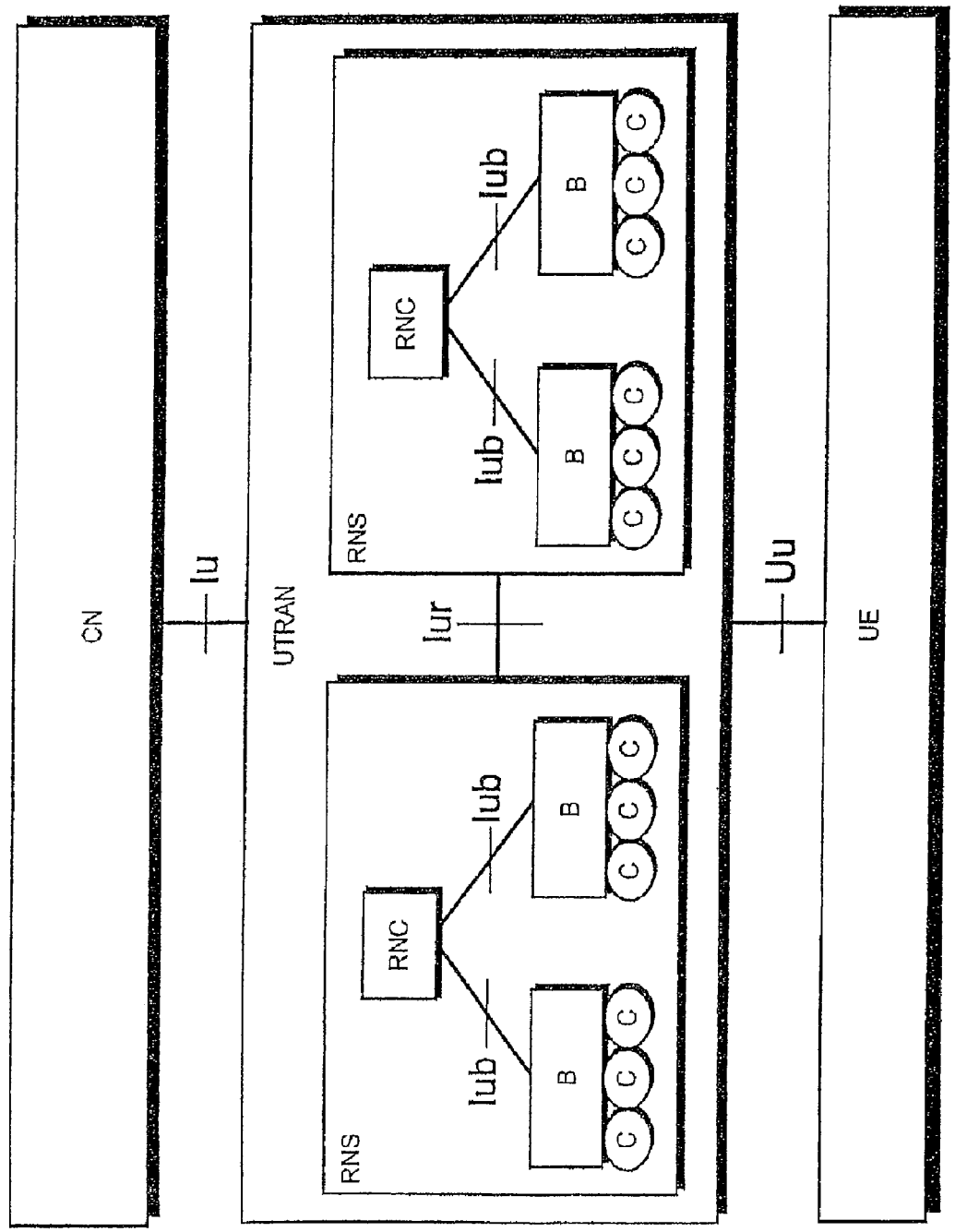
FIGS. 1A and 1B illustrate an example of a system of the disclosure.
Figure 1B:
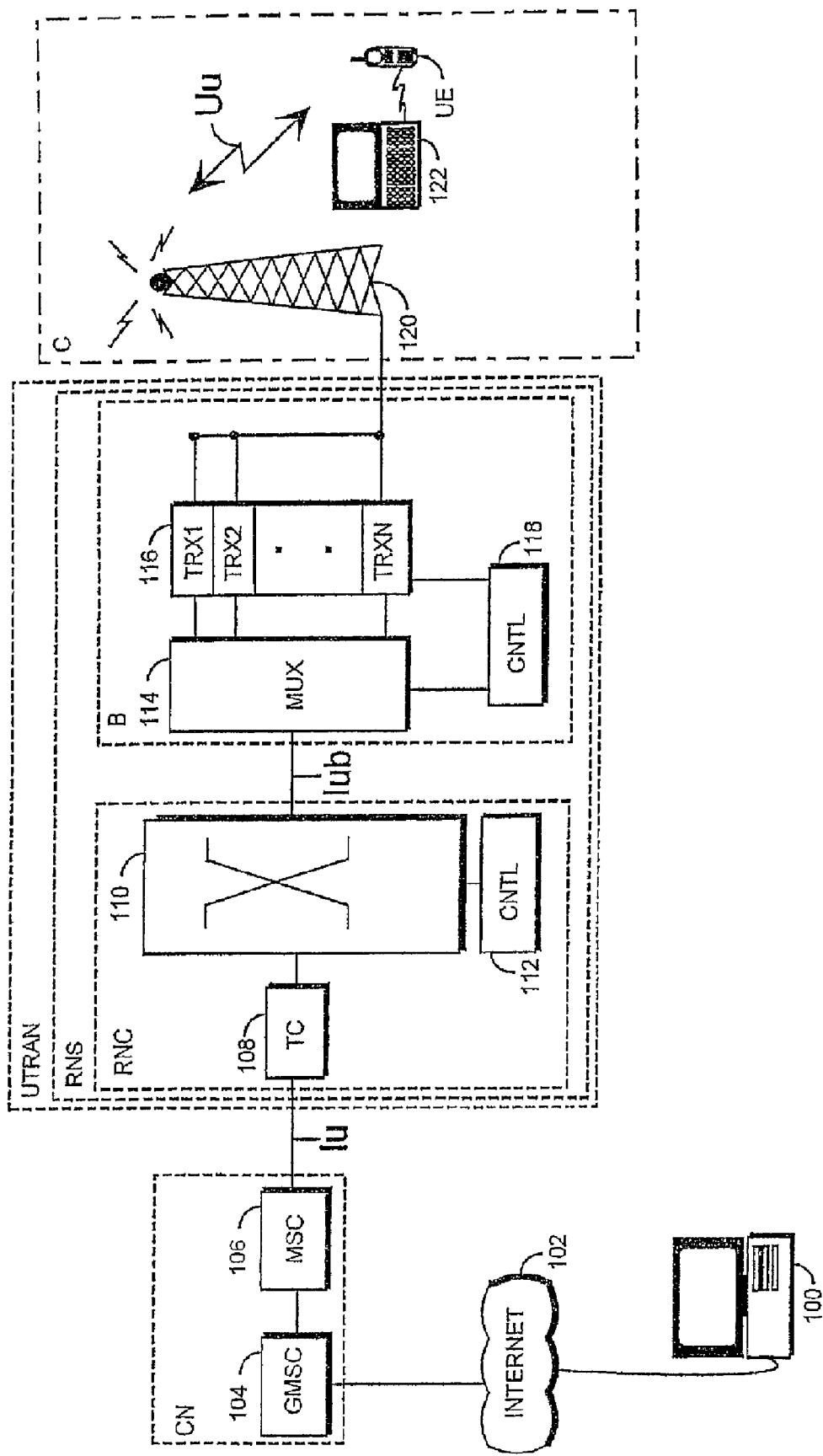

The illustration in FIG. 1A is extremely abstract, and is therefore further clarified in FIG. 1B by showing which parts of the GSM system and the UMTS approximately correspond to one another. It should be noted that the mapping disclosed herein is not restrictive but only suggestive, since the responsibilities and functions of different parts of the UMTS are still being developed.

FIG. 1B shows packet transmission through the Internet 102 from a computer 100 that is connected to a mobile system to a portable computer 122 connected to a user equipment UE. The UE can be, for example, a fixedly mounted, a vehicle-mounted or a hand-held portable terminal. The radio network infrastructure UTRAN comprises radio network subsystems RNS, or base station systems. An RNS includes a radio network controller RNC, or a base station controller, and at least one node B, or base station, controlled by the RNC.

The base station B comprises a multiplexer 114, transceivers 116 and a control unit 118 controlling the operation of the transceivers 116 and the multiplexer 114. The multiplexer 114 places traffic and control channels used by several transceivers 116 on the transmission connection Iub.

The transceivers 116 of the base station B are connected to an antenna unit 120, which implements a bidirectional radio connection Uu to the user equipment UE. The structure of the frames transmitted over the bidirectional radio connection Uu is accurately specified.

The base station controller RNC comprises a group switching field 110 and a control unit 112. The group switching field 110 is used to switch speech and data and to combine signalling circuits. The base station system formed of the base station B and the base station controller RNC also comprises a transcoder 108. The division of operations between the base station controller RNC and the base station B and the physical structure of the elements may vary in different implementations. Typically the base station B manages the implementation of the radio path as described above. The base station controller RNC typically controls the following matters: radio resource management, control of inter-cell handover, power control, timing and synchronization, paging of user equipment.

The transcoder 108 is usually located as close to a mobile services switching centre 106 as possible since speech can be transmitted in mobile telephone system form between the transcoder 108 and the base station controller RNC, thus saving transmission capacity. The transcoder 108 adapts different digital speech coding forms used between a public switched telephone network and a mobile telephone network to each other, converting for example a 64 kbit/s fixed network form into some other (such as a 13 kbit/s) form of the cellular radio network, and vice versa. The required equipment are not described in greater detail herein. However, it can be pointed out that speech is the only type of data that is converted in a transcoder 122. The control unit 112 performs call control, mobility management, collection of statistical data and signalling.

The core network CN consists of the infrastructure of the mobile telephone system outside the UTRAN. FIG. 1B shows the devices of the core network CN, such as the mobile services switching centre 106 and a gateway mobile services switching centre 104, which attends to the connections from the mobile telephone system to the outside world, in this case to the Internet 102.

An example of a frame structure that can be used on a physical channel is described with reference to FIG. 4. Frames 440A, 440B, 440C, 440D are consecutively numbered from one to seventy-two, and they form a 720-millisecond superframe. The length of one frame 440C is 10 milliseconds. The frame 440C is divided into 16 slots 430A, 430B, 430C, 430D. The length of one slot 430C is 0.625 milliseconds. One slot 430C typically corresponds to one power control period, during which power is adjusted, for example, by one decibel upwards or downwards.

Physical channels are divided into different types, including common physical channels and dedicated physical channels.

The following transport channels are carried on the common physical channels: PCH (Paging Channel), BCH (Broadcast channel), RACH (Random Access Channel) and FACH (Forward Access Channel).

Dedicated physical channels comprise dedicated physical data channels (DPDCH) 410 and dedicated physical control channels (DPCCH) 412. The DPDCHs 410 are used to carry data 406 generated in layer two of OSI (Open Systems Interconnection) and in the layers above it, i.e. dedicated control channels. The DPCCHs 412 carry control information generated in layer one of the OSI. The control information comprises: pilot bits 400 used in channel estimation, feedback information (FBI) 408, transmit power control commands (TPC) 402, and optionally a transport format combination indicator (TFCI) 404. The transport combination format indicator 404 informs the receiver about the transport format of different transport channels, or the transport format combination used in said frame.

Figure 4:
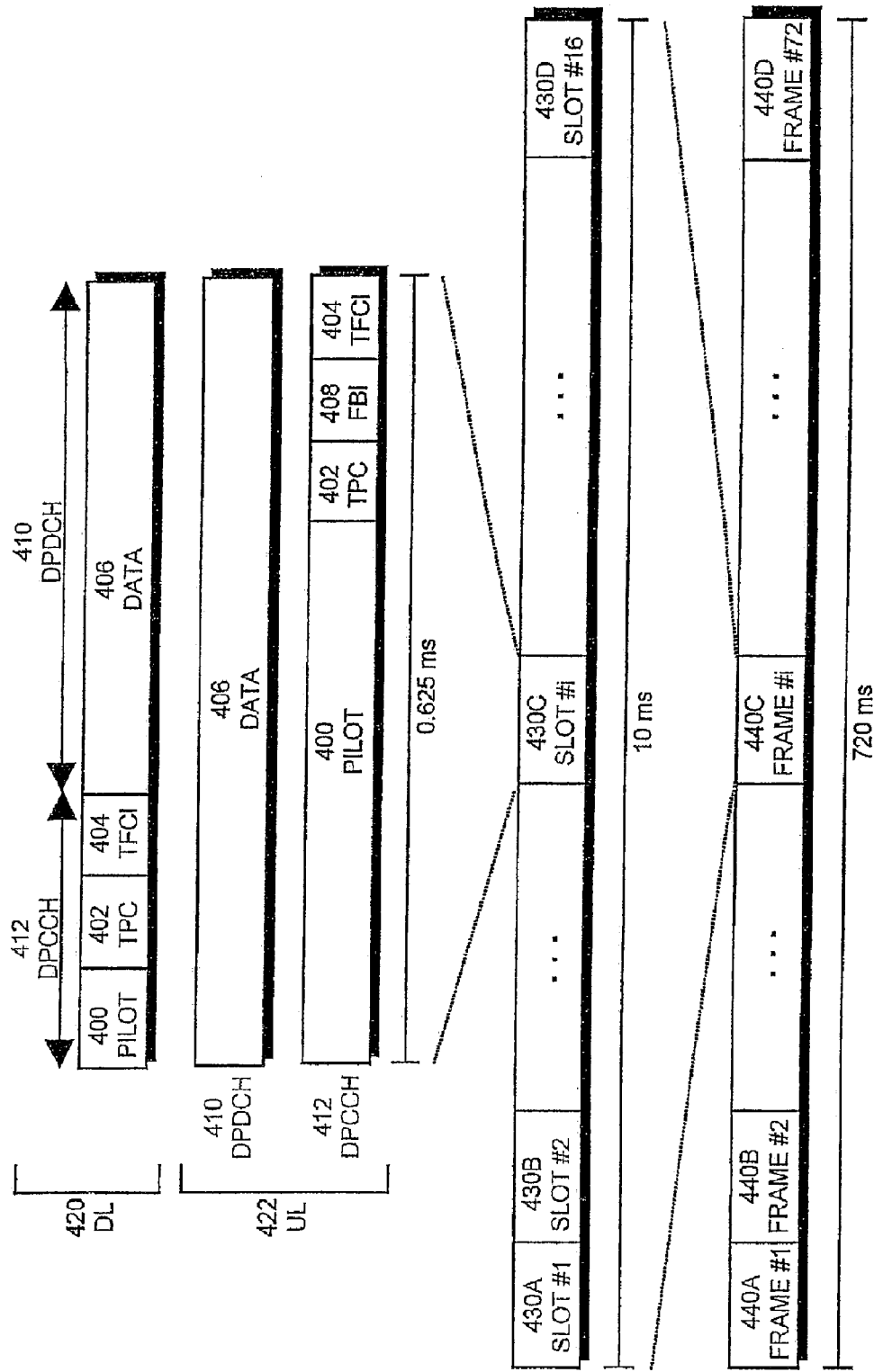
FIG. 4 illustrates an example of the structure of a frame to be used on a radio connection.

As FIG. 4 shows, the downlink DPDCHs 410 and DPCCHs 412 are time-multiplexed into the same slot 430C. In the uplink direction the channels are, in turn, transmitted in parallel so that they are IQ/code-multiplexed (I=in-phase, Q=quadrature) into each frame 440C.

Figure 2:
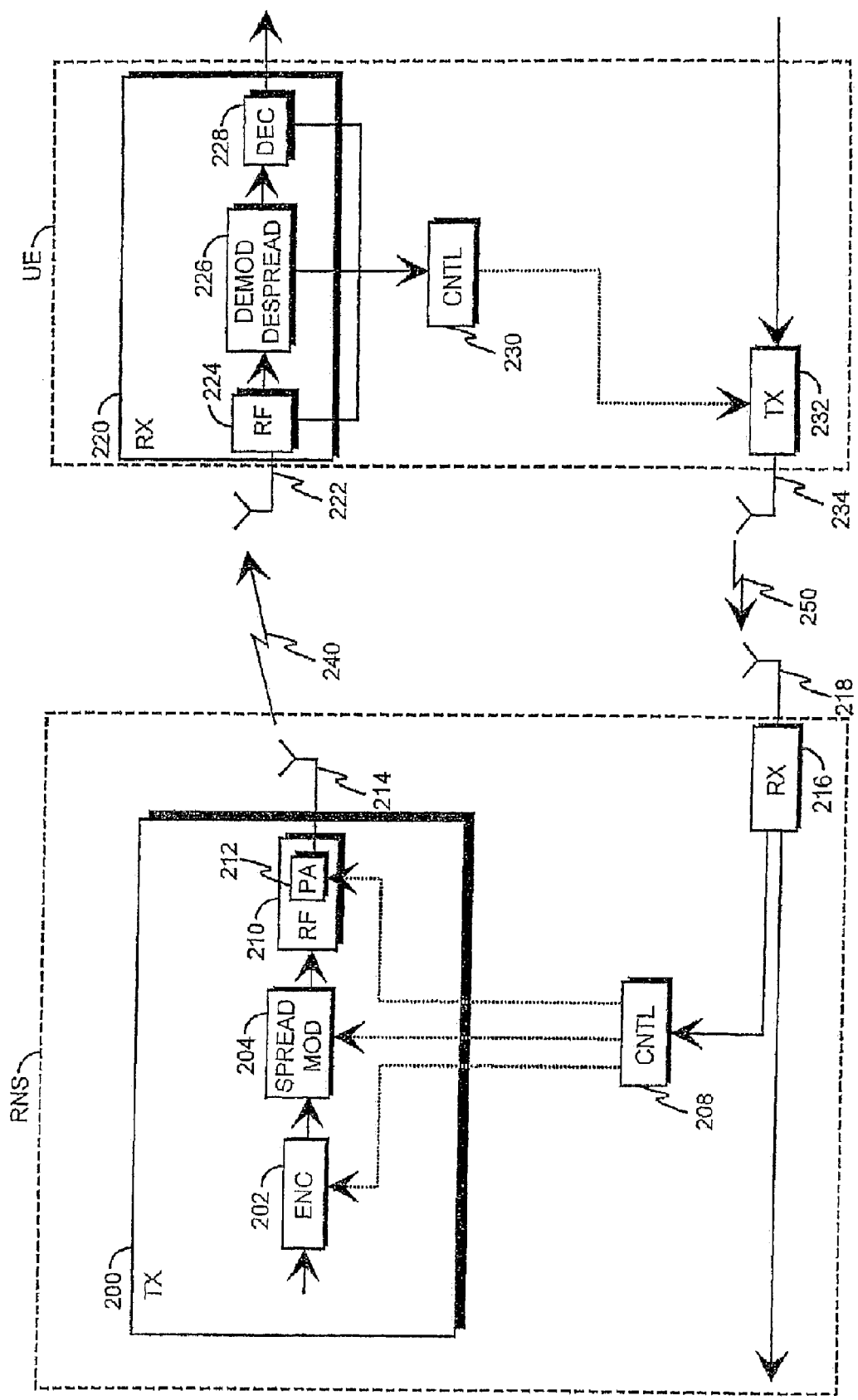
FIG. 2 illustrates the operation of a transmitter and a user equipment of the disclosure.

FIG. 2 illustrates a transmitter 200 of the disclosure and a user equipment UE. The Figure shows only the basic functions of the radio transmitter 200. Different services to be placed in a physical channel include speech, data, moving or still video image, and system control channels, which are processed in a control part 208 of the radio transmitter. The Figure only shows the data processing. Different services require different source coding means, for example speech calls for a speech codec. However, for the sake of clarity the source coding means are not shown in FIG. 2.

Packets from the computer 100 arrive at the radio network subsystem RNS as shown in FIG. 1B, where channel coding is carried out in a channel coder 202. The channel coding is typically convolutional coding and different modifications thereof, such as turbo coding. Channel coding also includes different block codes, such as cyclic redundancy check (CRC) and the Reed-Solomon code.

Interleaving is not shown in FIG. 2. The purpose of interleaving is to facilitate error correction. In interleaving signal bits are mixed together in a particular manner, and therefore a momentary fade over the radio path does not necessarily make the transmitted information impossible to identify.

The signal is spread by a spreading code and modulated in a block 204. The information to be transferred in the services is multiplied by the spreading code, whereby the relatively narrowband information is spread into a wide frequency band. Each connection Uu has a specific spreading code by which the receiver identifies the transmissions intended thereto. The pulse form of the signal obtained can be filtered. The signal is then modulated to a radio frequency carrier by multiplying it by a carrier. The signal obtained is ready to be sent to the radio path Uu irrespective of possible filterings and power gains.

Typically, the maximum number of mutually orthogonal spreading codes simultaneously in use is two hundred and fifty-six. For example, when a 4.096 megachip carrier is used in the UMTS, the spreading factor 256 corresponds to a transmission rate of thirty-two kilobits/second. Correspondingly, the highest practical transmission rate is achieved with the spreading factor four, the data transmission rate then being two thousand and forty-eight kilobits/second. The transmission rate on the channel varies stepwise between 32, 64, 128, 256, 512, 1024 and 2048 kbit/s, while the spreading factor correspondingly varies between 256, 128, 64, 32, 16, 8 and 4. The transmission rate obtained by the user depends on the channel coding used. For example, while using ⅓ convolution coding the data transmission rate of the user is approximately one third of the actual data transmission rate of the channel. The spreading factor may indicate the length of the spreading code. For example the spreading code (1) corresponds with spreading factor one. Spreading factor two has two mutually orthogonal spreading codes (1,1) and (1,−1). Furthermore, spreading factor four has four mutually orthogonal spreading codes: (1,1,1,1), (1,1,−1,−1) beneath the upper level spreading code (1,1) and spreading codes (1,−1,1,−1) and (1,−1,−1,1) beneath the upper level of the second spreading code (1,−1). The spreading codes at a certain level are generally mutually orthogonal, for example when using the Walsh-Hadamard code sets.

The modulated signal is supplied to radio frequency parts 210 comprising a power amplifier 212. The radio-frequency parts 210 may also comprise filters that restrict the bandwidth. An analogue radio signal 240 is thereafter transmitted through the antenna 214 to the radio path Uu.

The radio receiver 220 is typically a Rake receiver. An analogue radio-frequency signal 240 is received from the radio path Uu by an antenna 222. The signal 240 is supplied to radio-frequency parts 224 comprising a filter which blocks frequencies outside the desired frequency band. The signal is thereafter converted in a demodulator 226 into an intermediate frequency or directly to a baseband, in which mode the converted signal is sampled and quantized.

As the signal has propagated through several paths, the multipath-propagated signal components are preferably combined in a block 226 comprising several Rake fingers according to the prior art.

A rowing Rake finger searches for delays for each multipath-propagated signal component. After locating the delays, each different Rake finger is allocated to receive a specific multipath-propagated signal component. In reception a received signal component is correlated by the spreading code used, which has been delayed by the delay located for the multipath concerned. The different demodulated and despread multipath-propagated components of the same signal are combined so as to obtain a stronger signal.

The signal is thereafter supplied to a channel decoder 228 decoding the channel coding used in the transmission, for example block coding and convolutional coding. Convolutional coding is preferably decoded by a Viterbi decoder. The data obtained and originally transmitted is supplied to a computer 122 connected to the user equipment UE for further processing.

The quality value of the received signal is measured in a block 230. The measurements are associated with the channel conditions, such as channel parameters, signal reception power, bit-error rate, SINR ratio (Signal/Interference+Noise Ratio), SIR ratio (Signal/Interference Ratio), C/I ratio (Carrier/Interference Ratio) or with any other known method for measuring channel quality.

The downlink power control can be carried out, for example, so that a SIR target set by the network part is set for the connection. If the user equipment UE detects that the SIR target set cannot be achieved, the user equipment UE signals a transmitter 232 thereof by sending a power control command to the network part RNS. The power control commands may indicate an absolute power value, but generally they are proportional, i.e. the power control command indicates for example that the power has to be adjusted by a certain amount of decibels upwards or downwards.

The transmitter 232 of the user equipment UE sends a power control command 250 to the network part RNS using an antenna 234. In the example shown in FIG. 4 the power control command is placed in the transmit power control command 402 of the frame, or is transferred using the uplink DPCCH.

The network part RNS comprises a receiver 216 receiving a power control command 250 sent by the user equipment UE using an antenna 218 thereof. The power control command is then processed in decision means 208 of the network part RNS, in which the transmission power needed in the transmitter 2 is specified. The power amplifier 212 is controlled to send the signal to the user equipment UE at the desired power.

In accordance with the disclosure the decision means 208 use on a radio connection 240 the delay requirement of the service to be transferred and at least one received power control command as the basis for the power control decision.

The simulations carried out by the applicant show that fast downlink power control increases the system capacity when transferring real time services, such as speech. The studies made by the applicant correspondingly reveal that when non-real time services are transferred it is preferable for the system capacity to use slow downlink power control, since the capacity can be increased by as much as 2.5 decibels. The studies made on non-real time services are published in an article by Mika Raitola and Harri Holma: Wideband CDMA Packet Radio With Hybrid ARQ in publication IEEE Fifth International Symposium on Spread Spectrum Techniques & Application, IEEE ISSSTA '98 Proceedings, ISBN: 0-7803-4281-X, which article is incorporated herein by reference.

An example of non-real time services is packet-switched data transmission, where a connection is established between users by transferring data in packets that include address and control information/data in addition to actual data. Packet transmission frequently uses a basic form or a more advanced form of an ARQ protocol. The ARQ (Automatic Repeat Request) protocol refers to a procedure in which the retransmission of the data to be transferred can improve the reliability of the data to be transferred by increasing the bit error rate thereof. A more advanced form of the ARQ basic protocol is a hybrid ARQ, which employs a combination of the ARQ and an FEC (Forward Error Correction). The FEC indicates that the data to be transferred is coded with a coding that corrects errors, i.e. when using the terms in FIG. 2 the FEC refers to channel coding that is carried out in a channel coder 202.

The maximum delay of the service becomes shorter when the ARQ protocol is used together with fast power control than if the ARQ protocol is used without fast power control. One reason for this is that when the channel fades, fast power control allows to rapidly increase the transmission power. The use of slow power control would result in retransmitting the data. Retransmission increases time diversity, which in turn increases capacity. The delays vary more extensively when slow power control is used than when fast power control is used.

Let us assume that the frame error ratio of packet transmission is ten percent after the first data transmission, and that the frame errors are uncorrelated. These assumptions are adequately valid in connection with fast power control. When slow power control is used for slow moving user equipment (the rate below 10 km/h), the frames are correlated, and longer delays occur during channel fadings. Table 1 shows the delay division of packets when fast power control is used. It is assumed in the table that each retransmission adds three frames, i.e. 30 milliseconds of additional delay, and that no errors occur on the feedback channel.

TABLE 1

| Number of retransmissions | Probability | Delay |
| --- | --- | --- |
| 1 | 90% | 10 ms |
| 2 | 10% | 40 ms |
| 3 | 1% | 70 ms |
| 4 | 0.1% | 100 ms |
| 5 | $10^{-4}$ | 130 ms |
| 6 | $10^{-5}$ | 170 ms |
| 7 | $10^{-6}$ | 200 ms |

The studies made be the Applicant show that the optimal $E_b/N_0$ target using fast power control is very narrow, whereas slow power control provide a very even capacity curve. The operation points of slow power control can be decreased without dramatically affecting the performance. This provides flexibility for the downlink load control.

Furthermore, the studies carried out by the Applicant show that if fast power control is not used then averagely lower transmission powers are required. The variations in transmission power need not be considered either. Slow power control sets lower requirements for the power amplifier of the base station transmitter, since the headroom required by fast power control is not needed in the power amplifier. As the transmission power on the channel generally varies, for example, from minus three to plus three decibels, the transmission power has to be increased up to plus fifteen decibels during channel fading, when fast power control is used. Headroom refers to the difference in variation between an optimal transmission power and an average transmission power.

Figure 3A:
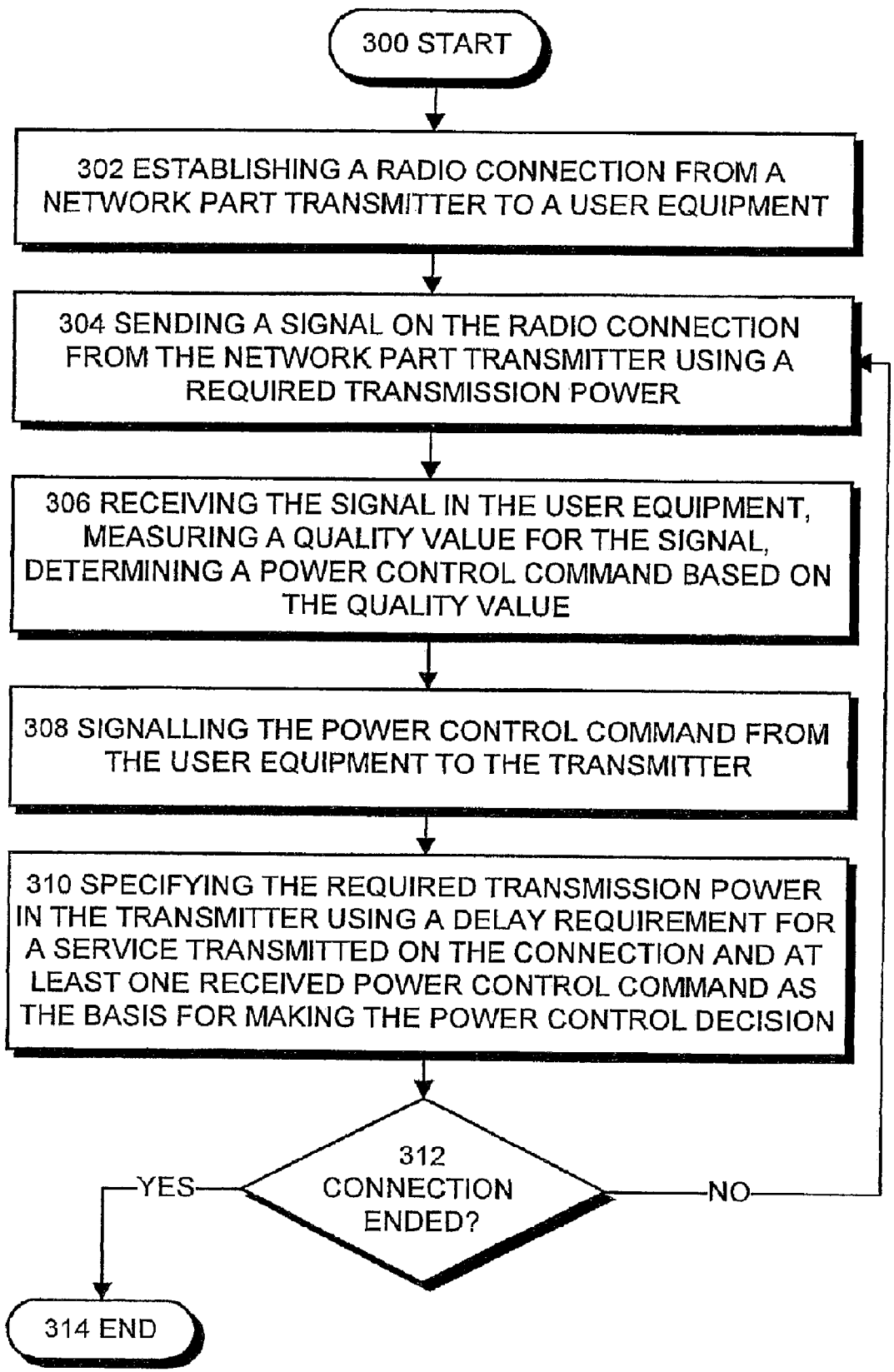
FIG. 3A is a flowchart showing a basic method of the disclosure.

In the following, the operations to be performed in the power control method of the disclosure are presented with reference to FIG. 3A. The implementation of the method starts from block 300. The radio connection 240 is formed in block 302 from the network part RNS transmitter 200 to the user equipment UE.

A signal is sent over the radio connection 240 in block 304 from the network part RNS transmitter 200 using the required transmission power. In the beginning of the connection the transmission power may be a default.

In block 306 the signal is received in the user equipment UE, and a quality value is measured for the signal in accordance with one of the above described prior art methods. The quality value determines the power control command, such as "add transmission power by one decibel" or "reduce transmission power by one decibel". In block 308 the power control command is signaled from the user equipment UE to the network part RNS transmitter.

The required transmission power needed in the transmitter is specified in block 310 using the delay requirement of the service to be transferred on the radio connection and at least one received power control command as the basis for making the power control decision. The operation of this block is explained in greater detail in FIG. 3B.

In block 312 it is checked whether the radio connection 240 is still in operation. If the radio connection does not operate any longer, then the process proceeds to block 314, where the method is ended. Since the method described performs power control on one radio connection only, and since a network part transmitter 200 may simultaneously have various connections to different user equipment, it is obvious that the method of the disclosure can be carried out in parallel for various connections simultaneously in one transmitter 200.

If the radio connection is not ended, then the process proceeds from block 312 to block 304, where the method is carried out from the second operation, i.e. the following signal is sent on the radio connection 240 from the network part RNS transmitter 200 using the transmission power required. Here the term "transmission power required" refers to the transmission power specified in block 310 particularly in accordance with the disclosure.

Figure 3B:
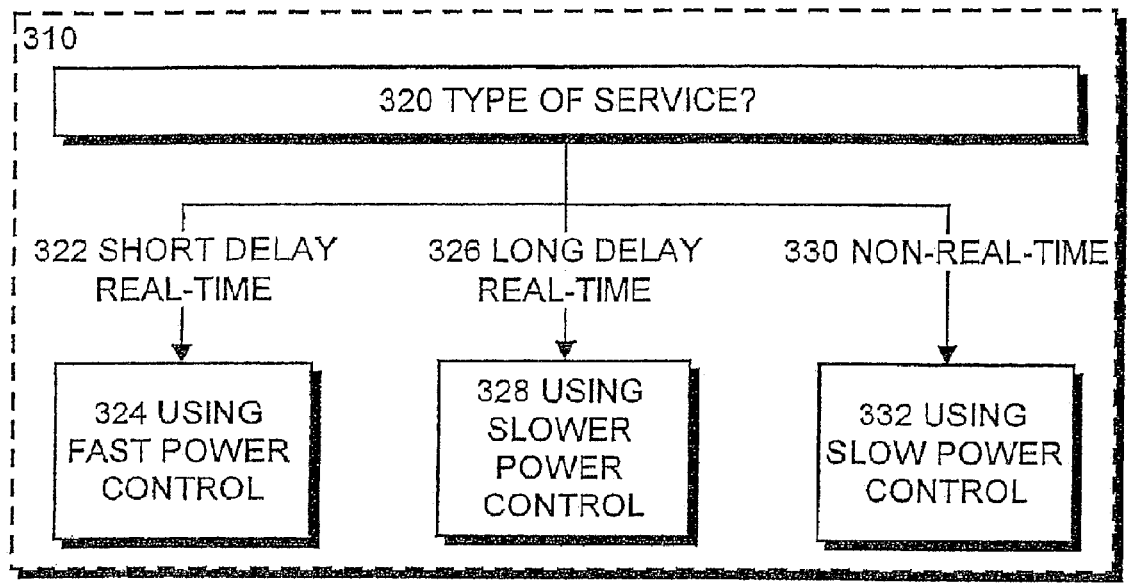
FIGS. 3B and 3C are flowcharts complementing the basic method of the disclosure in FIG. 3A with preferred embodiments.

In the following, the operation of block 310 will be explained in greater detail with reference to FIG. 3B. The operation of block 310 is formed of the operations of blocks 320, 322, 326 and 330.

In block 320 a choice is made according to the type of service. When dividing the services the delay requirement thereof is the determining factor. The service becomes more real time the shorter the delay requirement is.

When a short delay real time service 322 is concerned, for example speech transmission or short delay real time data, the process proceeds to block 324 according to which fast power control is used, and in which the transmission power required is specified after the reception of each power control command.

When a long delay real time service is concerned, for example fast delay real time data, then the process proceeds to block 326 according to which slower power control than the fast power control is used, and in which the transmission power required is not changed after each received power control command. It is obvious for those skilled in the art that the frequency of the power control to be performed can then be arranged to suit the nature of the data to be transferred.

When a non-real time service is concerned, such as the use of a web browser or one-directional data transmission, the process proceeds to block 330, according to which slow power control is used, and in which the transmission power required is not changed after each received power control command.

It is difficult to precisely define "fast power control", "slower than fast power control" and "slow power control", since the limits thereof depend on the radio system to be examined. However, it can be noted that for example in the universal mobile system the frequency of fast power control is approximately 800 to 1600 Hz, i.e. the maximum power control is performed separately for each frame slot used on the radio connection. Correspondingly, the frequency of slow power control varies between 1.4 to 100 Hz, i.e. the required transmission power is changed at the most for each frame or super-frame to be used on the radio connection. The power control which is slower than the fast power control may vary between these extreme ends, or between 100 to 800 Hz.

It can be noted in this context that the disclosure can be employed in such systems in which the signaling of a physical layer supports fast power control only. When slower than fast power control is desired, a quantity describing an average value is calculated from a certain amount of fast power control power control commands, the quantity then being used as a basis for making the power control decision. For example in the universal mobile system, the value of one slow power control command regarding one frame can be calculated from the power control commands regarding all slots of said frame, i.e. from 16 power control commands in all. The situation can for instance be such that nine commands include the command "increase transmission power by one decibel" and seven commands include the command "reduce transmission power by one decibel". In such a case the command "increase transmission power by two decibels" could be considered as an average command. Depending on the power amplifier properties, certain limits might have to be set for power control, since the transmission power cannot exceed a certain limit, or be lower than a certain limit. If the power range is not sufficient then the connection is disconnected, or in the case of packet transmission a larger number of retransmissions is performed. Another way to solve the problem is to use handover.

Figure 3C:
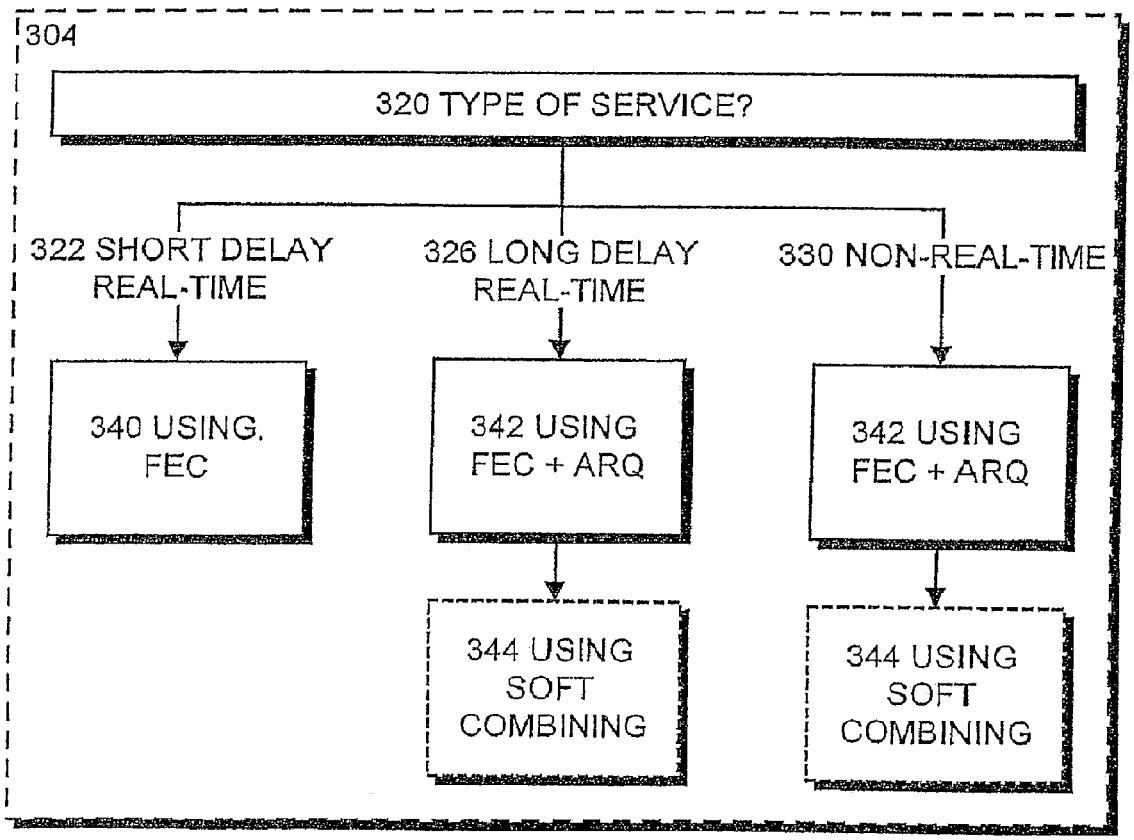

FIG. 3C illustrates the effect of a service to be transferred on the error correction strategy to be used. The measures to be carried out 320, 340, 342 and 344 are included in block 304 of FIG. 3A, in which a signal to be transmitted is formed and transmitted.

In block 320 a choice is made according to the type of service.

When a short delay real time service 322 is concerned, the information in such a service is typically protected with an error correcting FEC coding in accordance with block 340. Fast power control allows to guarantee an adequate quality for each FEC coding/interleaving sequence.

When a long delay real time service 326 is concerned, the information included in the service is protected in accordance with block 342 with at least an error correcting FEC coding, and if necessary retransmissions are implemented using an ARQ protocol. The power control may be slower than fast power control, since time diversity created by retransmissions can be utilized against a fading channel. The same procedure may be used when non-real time services are concerned, as no fixed delay requirements are set thereto, in which case random fairly long delays can be tolerated.

The performance of non-real time services are measured in accordance with the total performance, and not according to the delay at particular times. If the channel has faded but the channel conditions have not changed, then the only way to pass the data is to adequately add transmission power.

One way to reduce the repeated retransmissions of the same data packet, is to use soft combining of the transmitted data packets in accordance with block 344. The soft combining can be implemented either by combining data packets or by employing maximal ratio combining. The soft combining is disclosed in publications WO 98/49796 and WO 98/49797, which are incorporated herein by reference.

In a preferred embodiment at least one dedicated physical channel is allocated to the user equipment UE on the radio connection 240 and at least a part of a shared physical channel that is time-divisionally shared. In this case the downlink connection has a dedicated channel possibly with a small transmission capacity continuously in use, and if necessary a shared channel in use. The shared channel is employed in bursty data transmission when a large data transmission capacity is needed. The shared channel may have various users, and for instance a transportation format combination indicator 404 indicates who is liable to use the shared channel at a particular time. The soft combining described can also be used on a time-divisionally shared physical channel. The power control of the time-divisionally shared physical channel is carried out on the basis of the power control decision of the dedicated physical channel. The power control of the shared physical channel is naturally user-specific.

In the radio system according to FIG. 2 the disclosure assumes that the transmitter 200 comprises decision means 208 for specifying the transmission power required in the transmitter 200 using the delay requirement of the service to be transferred on the radio connection 240 and at least one received power control command as the basis for the power control decision.

The disclosure is preferably implemented by software, whereby the network part RNS, for example the transmitter 200, includes a microprocessor, in which the decision means are implemented as operating software. The disclosure can obviously also be implemented using apparatus solutions providing the required functionality, such as the ASIC (Application Specific Integrated Circuit) or as separate logic.

Even though the disclosure has been described above with reference to the example of the accompanying drawings, it is obvious that the disclosure is not restricted thereto but can be modified in various ways within the scope of the inventive idea disclosed in the attached claims.

What is claimed is:

1. An apparatus, comprising:
   a transmitter that establishes a radio connection that sends signals to a user equipment using a required transmission power;
   a receiver that receives a signal sent by the user equipment over the radio connection, the signal comprising at least one power control command determined by the user equipment; and
   a processor configured to specify the required transmission power in the transmitter using a delay requirement of a service to be transferred over the radio connection and the at least one power control command as a basis for making the power control decision,
   wherein at least one dedicated physical channel and at least a part of a shared physical channel that is time-divisionally shared are allocated to the user equipment on the radio connection,
   wherein the processor is further configured to carry out the power control of the time-divisionally shared physical channel on the basis of the power control decision of the dedicated physical channel.

2. The apparatus of claim 1, wherein the processor is further configured to use a fast power control for a short delay real-time service in which the required transmission power is specified after each received power control command.

3. The apparatus of claim 2, wherein the processor is further configured to protect information included in the short delay real-time service using a forward error-correcting code.

4. The apparatus of claim 1, wherein the processor is further configured to use a slower power control than a fast power control for long delay real-time services in which the required transmission power is not changed after each received power control command.

5. The apparatus of claim 1, wherein the processor is further configured to use a slow power control for non-real time services in which the required transmission power is not changed after each received power control command.

6. The apparatus of claim 1, wherein the processor is further configured to protect information included in the service using a forward error correcting code and to determine whether a retransmission using a retransmission request protocol is necessary.

7. The apparatus of claim 6, wherein the processor is further configured to implement a soft combining of data packets retransmitted in accordance with the retransmission request protocol included in the services to reduce a number of required retransmissions.

8. The apparatus of claim 7, wherein at least one dedicated physical channel and at least a part of a shared physical channel that is time-divisionally shared are allocated to the user equipment on the radio connection, wherein the processor is further configured to perform the soft combining of the retransmitted data packets on the time-divisionally shared physical channel.

9. The apparatus of claim 1, wherein the receiver receives the power control command separately for each frame slot to be used on the radio connection.

10. The apparatus of claim 1, wherein the processor is further configured to change the transmission power required less frequently than during each frame slot to be used on the radio connection.

11. The apparatus of claim 10, wherein the processor is further configured to change the transmission power required, at the most, during each frame to be used on the radio connection.

12. The apparatus of claim 10, wherein the processor is further configured to calculate a quantity describing an average value from a certain number of power control commands, the quantity thereafter being used as a basis for making the power control decision.

13. An apparatus configured for performing power control of a network part transmitter in a radio system, the apparatus comprising:
means for establishing a radio connection from the network part transmitter to a user equipment;
means for sending a signal on the radio connection from the network part transmitter using a required transmission power;
means for receiving signalling of a power control command from a user equipment at the transmitter, where the power control command is determined by the user equipment in response to receiving the signal sent from the radio part transmitter and measuring a quality value for the signal, where the power control command is determined based on the quality value;
means for specifying the power control required in the transmitter using a delay requirement of a service to be transferred over the radio connection and at least one received power control command as the basis for making a power control decision;
means for allocating at least one dedicated physical channel to the user equipment on the radio connection and at least a part of the shared physical channel that is time-divisionally shared; and
means for carrying out the power control of the time-divisionally shared physical channel on the basis of the power control decision of the dedicated physical channel.

14. The apparatus of claim 13, wherein short delay real time services use fast power control in which the transmission power required is specified after each received power control command.

15. A method for power control of a network, the method comprising:
establishing a radio connection from a network part transmitter to a user equipment;
sending a signal on the radio connection from the network part transmitter using a required transmission power;
receiving at least one power control command from the user equipment, said power control command being determined, at least in part, upon a quality value relating to a signal quality in the user equipment;
specifying a required power control for the transmitter using a delay requirement of a service to be transferred over the radio connection and said at least one received power control command as the basis for making a power control decision,
wherein at least one dedicated physical channel is allocated to the radio connection and at least a part of the shared physical channel that is time-divisionally shared, and the power control of the time-divisionally shared physical channel is carried out on the basis of the power control decision of the dedicated physical channel.

16. A computer program product containing a non-transitory computer-readable medium, the computer-readable medium comprising computer code thereon suitable for performing power control in a network which, when executed by a processor, causes the processor to:
establish a radio connection from a network part transmitter to a user equipment;
send a signal on the radio connection from the network part transmitter using a required transmission power;
interpret a power control command received from the user equipment;
specify a power control required in the transmitter using a delay requirement of a service to be transferred over the radio connection and at least one received power control command as the basis for making a power control decision;
allocate at least one dedicated physical channel to the user equipment on the radio connection and at least a part of the shared physical channel that is time-divisionally shared; and
carry out the power control of the time-divisionally shared physical channel on the basis of the power control decision of the dedicated physical channel.

17. The computer program product of claim 16, wherein the computer code, when executed, causes the processor to assign a fast power control for short delay real-time services so as to specify the transmission power required after each received power control command.

* * * * *